(12) United States Patent
Alm (10) Patent No.: US 6,829,395 B2
(45) Date of Patent: Dec. 7, 2004

(54) APPARATUS AND METHOD FOR STORING AND READING DIGITAL IMAGES (75) Inventor: Carl-Axel Alm, Lund (SE)

(73) Assignee: Axis, AB (SE)

( * ) Notice: Subject to any disclaimer, the term of this patent is extended or adjusted under 35 U.S.C. 154(b) by 572 days.

(21) Appl. No.: 09/766,217

(22) Filed: Jan. 19, 2001

(65) Prior Publication Data
US 2001/0022862 A1 Sep. 20, 2001

Related U.S. Application Data (60) Provisional application No. 60/180,471, filed on Feb. 3, 2000.

(30) Foreign Application Priority Data

Jan. 20, 2000 (SE) ............................... 0000155

(51) Int. Cl.$^7$ ................................. G06K 9/32
(52) U.S. Cl. ........................ 382/305; 382/103; 348/22
(58) Field of Search ................................. 382/162, 164, 382/165, 305, 306, 304, 103, 107, 177, 184, 276, 291; 250/216, 227.24, 559.3, 559.6; 348/22, 142, 25, 42, 153, 154, 169; 345/531, 181

(56) References Cited

U.S. PATENT DOCUMENTS

| | | | | |
|---|---|---|---|---|
| 5,485,611 A | * | 1/1996 | Astle ............................. | 707/1 |
| 5,519,436 A | * | 5/1996 | Munson .................... | 348/14.15 |
| 5,751,346 A | * | 5/1998 | Dozier et al. ............... | 348/153 |
| 5,856,665 A | * | 1/1999 | Price et al. ................. | 250/205 |
| 5,969,755 A | * | 10/1999 | Courtney .................... | 348/143 |
| 6,044,166 A | * | 3/2000 | Bassman et al. ............ | 382/103 |
| 6,591,006 B1 | * | 7/2003 | Niemann .................... | 382/162 |

FOREIGN PATENT DOCUMENTS

| | | |
|---|---|---|
| EP | 0828392 A2 | 3/1998 |
| JP | 09081733 A | 3/1997 |
| JP | 09322028 A | 12/1997 |

OTHER PUBLICATIONS

"Updating a reference image for detecting motion in urban scenes", Patrick Vannoorenberghe et al., Laboratoire d'Analyse des Systemes du Littoral, Universite du Littoral–Cote d'Opale (First submission on Jan. 19, 2001. Resubmission of the Certified copy of Translation).

"Reactualisation d'une image de reference pour la detection du mouvement dans les scenes urbanes", Patrick Vannoorenberghe et al., Laboratoire d'Analyse des Systemes du Littoral, Universite du Littoral–Cote d'Opale.

* cited by examiner

Primary Examiner—Bhavesh M. Mehta
Assistant Examiner—Seyed Azarian
(74) Attorney, Agent, or Firm—IP Creators; Charles C. Cary (57) ABSTRACT An apparatus for storing digital images has a storage device for storing a current reference image and a plurality of differential images, and an image processing device coupled to the storage device. The image processing device receives an individual digital image, determines a difference between the individual image and the current reference image, and stores this difference as a differential image in the storage device. The apparatus also has reference image updating means for determining when to generate a new reference image, for generating the new reference image, for replacing the current reference image with the new reference image, and for storing the new reference image as current reference image in the storage device.

14 Claims, 7 Drawing Sheets

APPARATUS AND METHOD FOR STORING AND READING DIGITAL IMAGES

This application claims the priority of Swedish Patent Application. No. 0000155-2 filed Jan. 20, 2000 and U.S. Provisional Patent Application No. 60/180,471 filed Feb. 3, 2000.

TECHNICAL FIELD

The present invention generally relates to storing and reading digital images in and from a storage device. More particularly, the present invention is directed at providing a reduction in storage space when storing a large number of digital images, typically in the form of a sequence of images from a surveillance camera.

BACKGROUND ART

Surveillance camera systems are commonly used for monitoring various business areas, such as cashier windows at a bank or gambling tables at a casino. Traditionally, such surveillance systems have included analog video cameras, which continuously record all activities within a surveillance zone on a magnetic tape cassette, such as a standard VHS cassette. Typically, such cassettes have a nominal recording time of a few hours, e.g. 2, 4 or 8 hours. When a tape cassette has been fully recorded, the cassette will have to be substituted by an empty one by a human operator.

The maximum recording time may be increased by reducing the speed, at which the magnetic tape is moved in relation to the recording head, thereby reducing the number of frames stored per second. In this way the maximum recording time for a standard VHS tape may be extended to e.g. 48 hours, thereby obviously also extending the time between cassette substitution correspondingly. However, the penalty for not having to switch tapes as frequently is a substantial reduction in image quality for the entire recording time.

In recent years, digital surveillance cameras have entered the market. Such cameras produce a sequence of digital snapshot images or still images at a constant rate. For instance, European-type digital video cameras produce images at a rate of 25 images or frames per second (fps), whereas US-type digital video cameras operate at 30 fps. When the sequence of images is played back, the rapid switch between images is transparent to a human observer. Instead, the sequence of snapshot images is experienced as a continuous stream of moving images. It is also known to use less advanced digital still cameras for surveillance purposes, wherein a digital still image is captured for instance each second and is then saved in sequence on an external storage device, such as a computer.

The output of digital cameras is stored on an appropriate storage medium, such as a magnetic disk (hard disk), an optical disk (CD, DVD) or a digital magnetic tape (DAT). Similarly, the output of analog cameras may be digitized into a sequence of digital images to be stored on such a storage medium.

The images are usually compressed by way of a data compression algorithm, such as JPEG, wavelet or fractal compression, wherein certain image information is eliminated and the amount of storage space is reduced accordingly for each individual image.

Moreover, digital video sequences are normally compressed through MPEG compression, which operates in a differential manner in that the redundancy between subsequent images is reduced by discrete Fourier transforms. More specifically, certain individual images are treated as isolated still images and act as base or reference frames (also known as "intra frames") for surrounding images. Such surrounding frames are referred to as either "predicted frames" or "bidirectional frames", and the compression aims at minimizing the redundancy of these frames with respect to their corresponding intra frame. Typically, in MPEG-1, every $12^{th}$ image is an intra frame; in other words, an intra frame occurs once every 0.4 seconds in a 30 fps video sequence.

In a typical, fairly simple surveillance application, such as the monitoring of an automatic teller machine (ATM), a fixed surveillance camera is used without any options for panning, tilting or zooming. In such a case, normally all images will look essentially the same for long periods of time (for instance, during all the time periods when no customer is using the ATM). Even MPEG compression would be a waste of storage space, since every 0.4 seconds a non-MPEG-compressed intra frame is stored, which very likely will look virtually identical to the previous intra frame as well as the ones before that.

U.S. Pat. No. 5,519,436 relates to a video teleconferencing system including a video controller with means for storing a reference image, means for receiving a foreground image, means for comparing the reference image with the foreground image, thereby identifying matching pixels, and means for replacing the matching pixels in the foreground image with null pixels. The reference image is intended to represent a fixed background and is initially captured and stored in the video controller at system start-up. The reference image then remains static or unmodified in a video memory of the video controller during the operation of the system.

By replacing matching pixels in the foreground image with null pixels, the thus modified foreground image may be processed more efficiently by a video compression algorithm and may also be more expediently transferred across a network. Consequently, the system of U.S. Pat. No. 5,519,436 is capable of reducing the amount of storage space required for storing the video images. The system, however, has a drawback in that the static reference image is generated once and for all at start-up and is never updated from that moment. In reality, however, the background will not remain completely static, as the environment will change over time. For instance, the light situation may change from dark to light or vice versa depending on the time of day, objects in the background may be moved, the video camera may be unintentionally tilted or moved in position, etc. As a result, the difference between a current foreground image and the initially generated background image will grow larger over time, since the pixel information in the two images will be more and more different from each other. Therefore, the resulting file size of the processed foreground image, i.e. the storage space occupied when storing the foreground image, will grow larger and larger.

SUMMARY OF THE INVENTION

It is therefore an object of the present invention to further reduce the amount of storage space required for storing large sequences of digital images in e.g. a surveillance camera system, where many of the images look essentially the same during long periods of time.

The object is achieved by an apparatus for storing digital images having a storage device and an image processing device. The image processing device receives an individual digital image, determines a difference between the digital image and a current reference image and stores this difference as a differential image in the storage device. Reference image updating means is provided for determining when to generate a new reference image. A new reference image thus generated will replace the current reference image and will be stored as current reference image in the storage device. For each individual differential image an identifying reference to the current reference image is stored in the storage device.

An individual differential image may subsequently be read together with the particular reference image, which was used as current reference image when producing the differential image in question. A non-differential image is produced by adding the individual differential image to the identified reference image.

Other objects, features and advantages of the present invention will appear from the following detailed disclosure of preferred and alternative embodiments, from the drawings as well as from the claims.

BRIEF DESCRIPTION OF THE DRAWINGS

The invention will be described in more detail in the following, reference being made to the accompanying drawings, in which.

DETAILED DISCLOSURE

Figure 1:
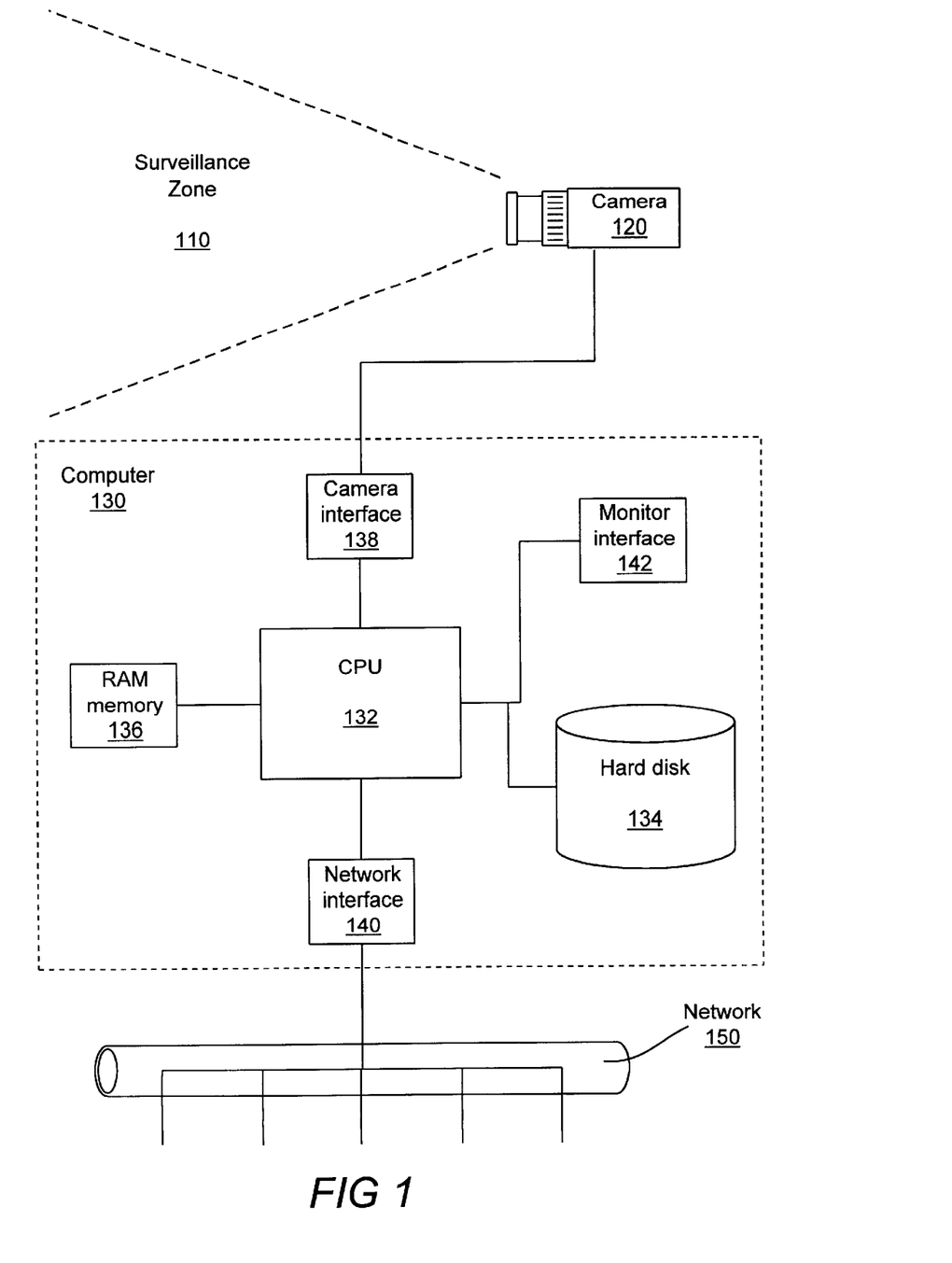
FIG. 1 is a schematic block diagram of a preferred embodiment of an apparatus according to the invention, when used in a camera surveillance application.

FIG. 1 is an overall view of a camera surveillance application, in which the invention may be implemented. A camera 120 is arranged to monitor a surveillance zone 110, which may be any given volume or area, which for some reason it is desired to monitor. Hence, the surveillance zone 110 may be a selected part of a bank, a post office, a casino, a factory, office premises, a prison, a criminal custody or detention room, a police station, a house garden, a garage or any other area of surveillance. The camera 110 is assumed in the following to be a digital camera, which is arranged to provide a sequence of snapshot or still images at a predetermined rate, such as 1–25 fps. However, the camera 110 may equally well be a conventional analog camera, providing analog image output, which is converted into digital images by a commercially available digitizer. The camera 120 of FIG. 1 is connected to a computer 130, by which the present invention is implemented according to a preferred embodiment. The computer 130 may be any commercially available computer such as a stationary personal computer, a lap-top computer, a work station, etc. It may be provided with any commercially available operating system, such as Microsoft Windows 9x, Microsoft Windows NT, Microsoft Windows 2000, Unix, Linux, etc.

The computer 130 comprises a central processing unit (CPU) 132, which is coupled to a hard disk 134 and a random access memory (RAM) 136, as is generally known per se. The CPU 132 is also connected to a camera interface 138, by means of which the camera 120 may be operatively connected to the computer 130. The CPU 132 is also connected to a monitor interface 142 for connecting any conventional computer monitor, such as a CRT monitor or an LCD display, to the computer 130. Moreover, the CPU 132 is connected to a network interface 140, which may be used for connecting the computer 130 to a network 150, such as a local area network (e.g. an Ethernet or Token Ring network), which in turn may be a part of a wide area network, such as the Internet.

The computer 130 is used according to the invention for receiving and storing a plurality of digital images captured by the camera 120. As will be described in more detail below, the computer 130 is arranged to determine a reference image, which will represent an essentially static background of the surveillance zone 110. Subsequently, once the reference image has been determined, the computer 130 will only store the respective differences between individual digital images and the reference image. In this way, less storage space will be occupied by each image.

Figure 3A:
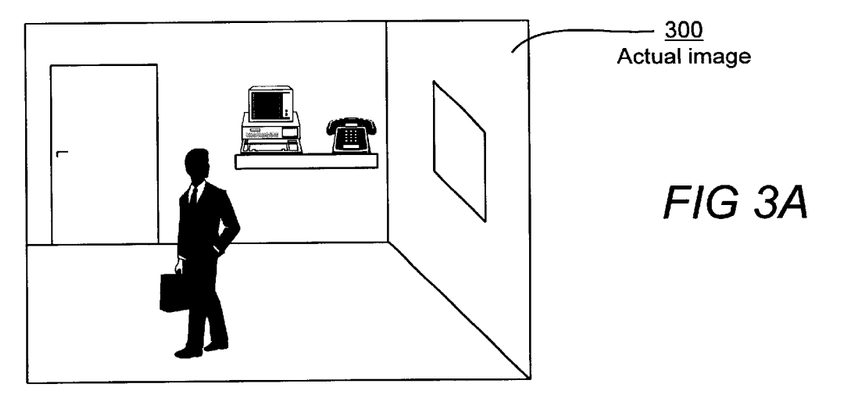
Figure 3B:
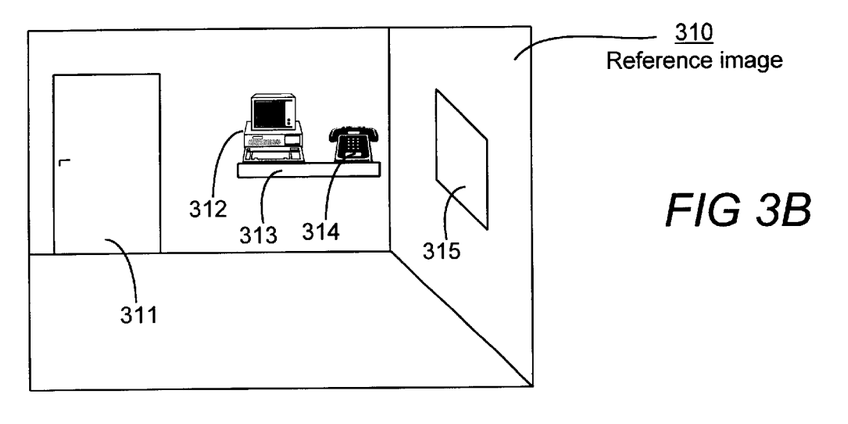
Figure 3C:
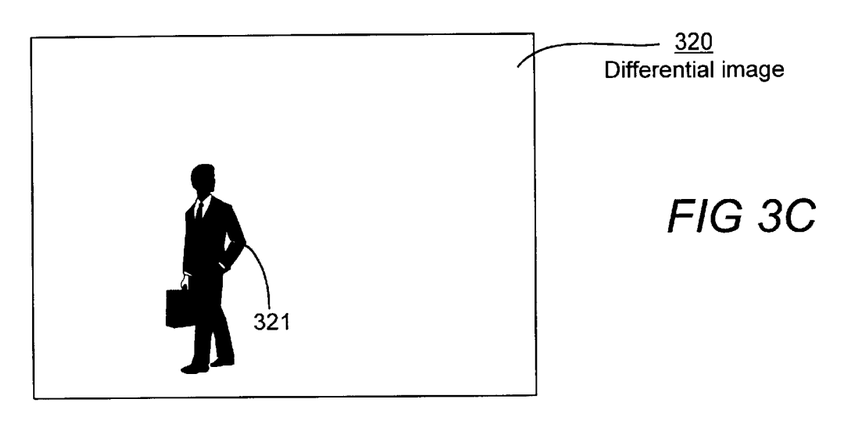

The above is illustrated more clearly in FIGS. 3A–3C. FIG. 3A illustrates an actual image 300, as captured by the camera 120 and supplied to the computer 130 through the camera interface 138. The actual image 300 comprises various objects, such as a door 311, a computer 312 and a telephone 314 residing on a shelf 313, and a window 315 (see FIG. 3B), as well as a moving person 321 (see FIG. 3C). Among these objects, the door 311, the computer 312, the shelf 313, the telephone 314 and the window 315 all look essentially the same in the various images produced by the camera 120. Consequently, the computer 130 is adapted to generate a reference image 310, which is shown in FIG. 3B and contains those parts of the actual image 300, which belong to the background of the image and are therefore essentially static. Correspondingly, the moving person 321 will only appear momentarily in one actual image 300, or at least only in a limited sequence of such images. The computer 130 is adapted to produce a differential image 320, which will only contain the non-static part of the actual image 300, i.e. the moving person 321, and will therefore occupy less storage space.

All differential images 320 are stored by the CPU 132 in the hard disk 134. The reference image 310 is also stored in the hard disk 134. In order to facilitate the operation of the CPU 132, a copy of the reference image 310 is kept in the RAM memory 136, which has a much faster access time than the hard disk 134. The differential image 320 is produced, pixel by pixel, by subtracting a pixel value of the reference image 310 from a corresponding pixel value of the actual image 300. Preferably, the differential images 320 are compressed according to any compression algorithm known per se, such as JPEG compression, wavelet compression or fractal compression, before they are stored in the hard disk 134.

The differential images 320 stored in the hard disk 134 may subsequently be read by the computer 130 and e.g. be presented on a monitor connected to the monitor interface 142, or alternatively be transmitted across the network 150 via the network interface 140. When reading the differential images 320 from 310 from the RAM memory 136 as well as an individual differential image 320 from the hard disk 134. If the differential image 320 was compressed before it was stored in the hard disk 134, the CPU 132 will decompress the differential image 320, when it has been read from the hard disk 134. Then, for each pixel, the pixel value of the reference image 310 will be added to the corresponding pixel value of the differential image 320, thereby restoring the actual image 300, which may then be displayed on a monitor or transmitted across the network.

Figure 5:
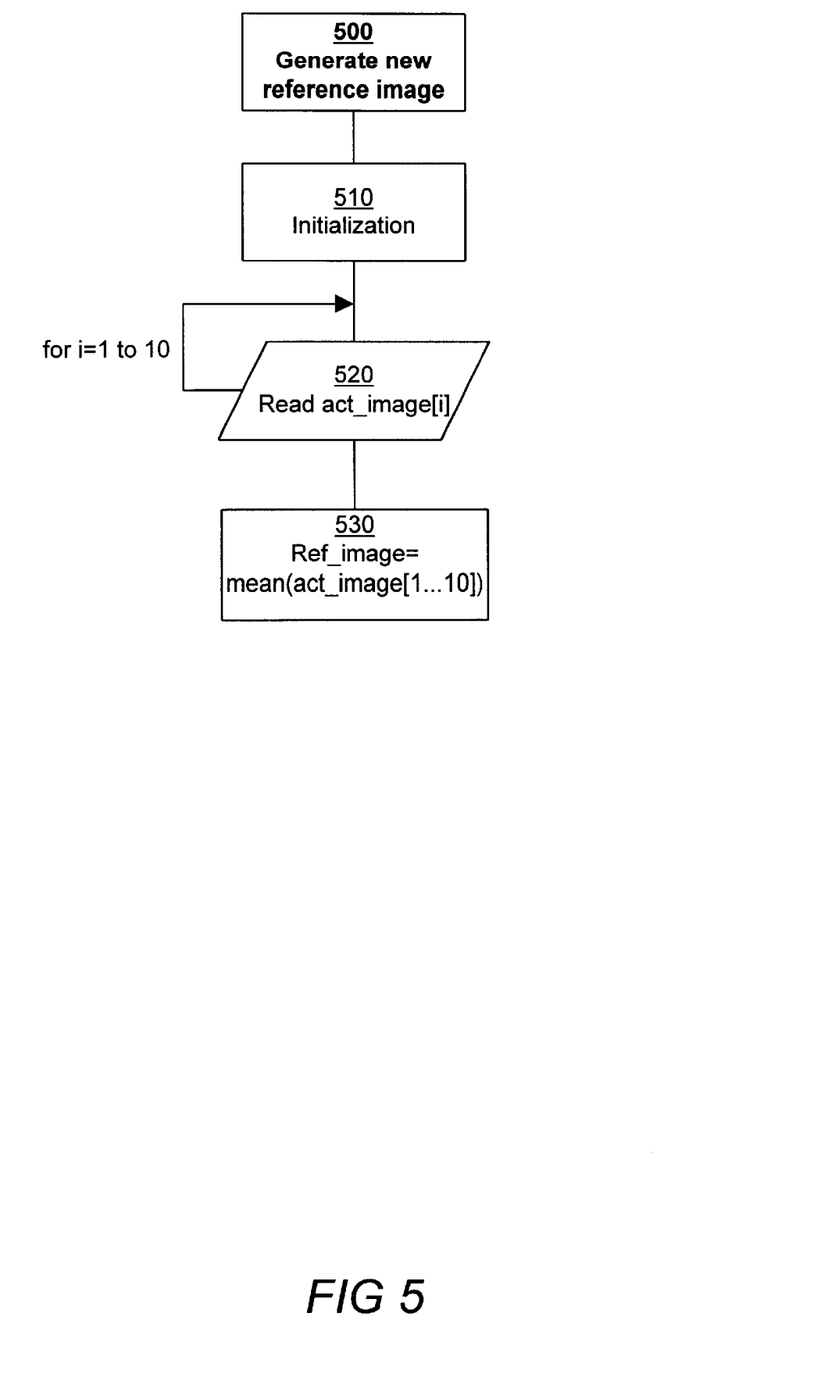
FIG. 5 is a flowchart diagram of a routine for generating a reference image according to the invention.
Figure 6:
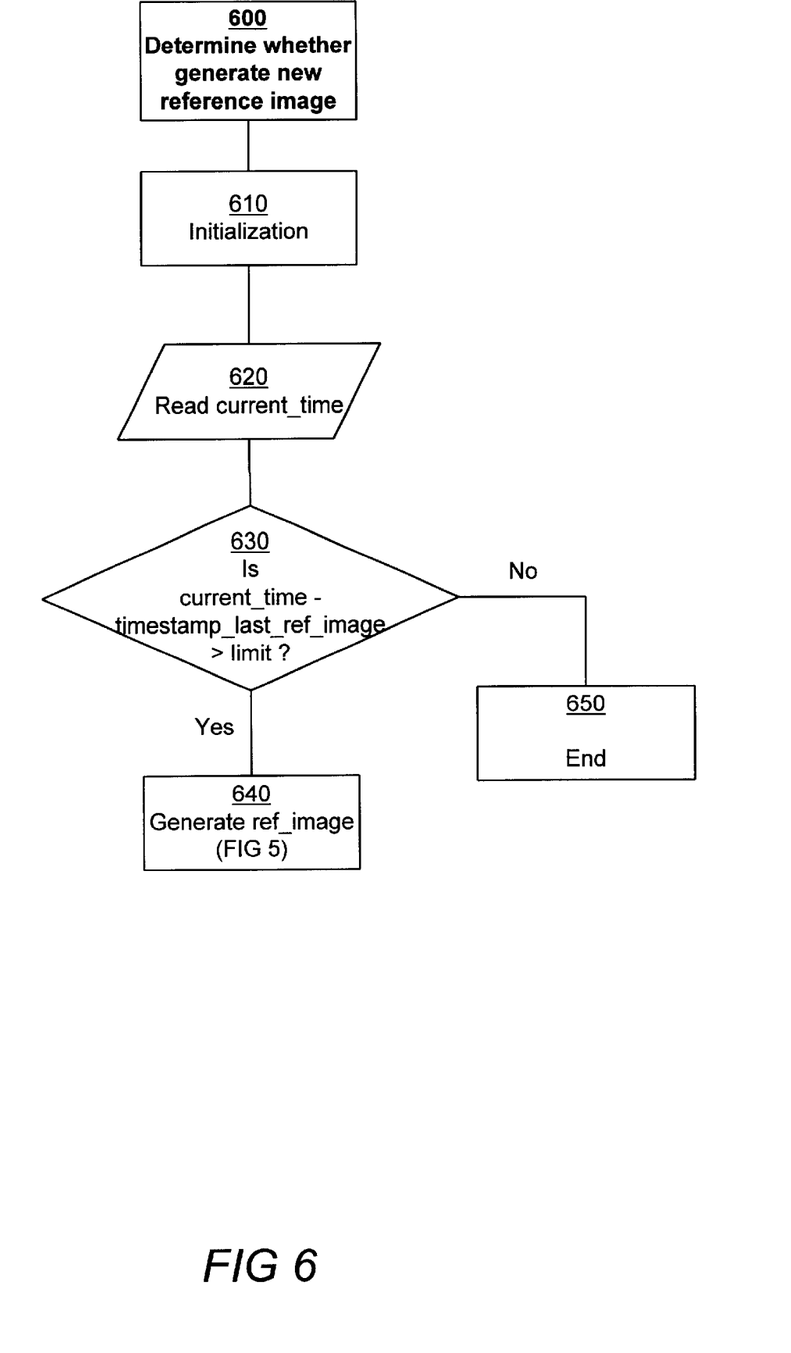
FIG. 6 is a flowchart diagram of a routine according to the invention for determining whether a new reference image is to be generated.

The environment in the surveillance zone 110 will change over time, e.g. due to different light situations depending on the time of day, because any of the portable background objects 312 or 314 has been moved, intentionally or not, by a human user, because the door 311 has been opened or closed, because curtains in front of the window 315 have been moved, etc. As a consequence, the difference between the actual images 300 and the originally generated reference image 310 will grow bigger and bigger, resulting in differential images 320 of increasing size. According to the invention, the existing reference image 310 will be replaced by a new reference image, which better represents the static background of the images produced in the surveillance zone 110, when it is determined that the existing reference image 310 does not sufficiently well represent the background of the actual image 300. Principles for generating such new reference images will be described in more detail below and are also illustrated in FIGS. 5 and 6.

Figure 4:
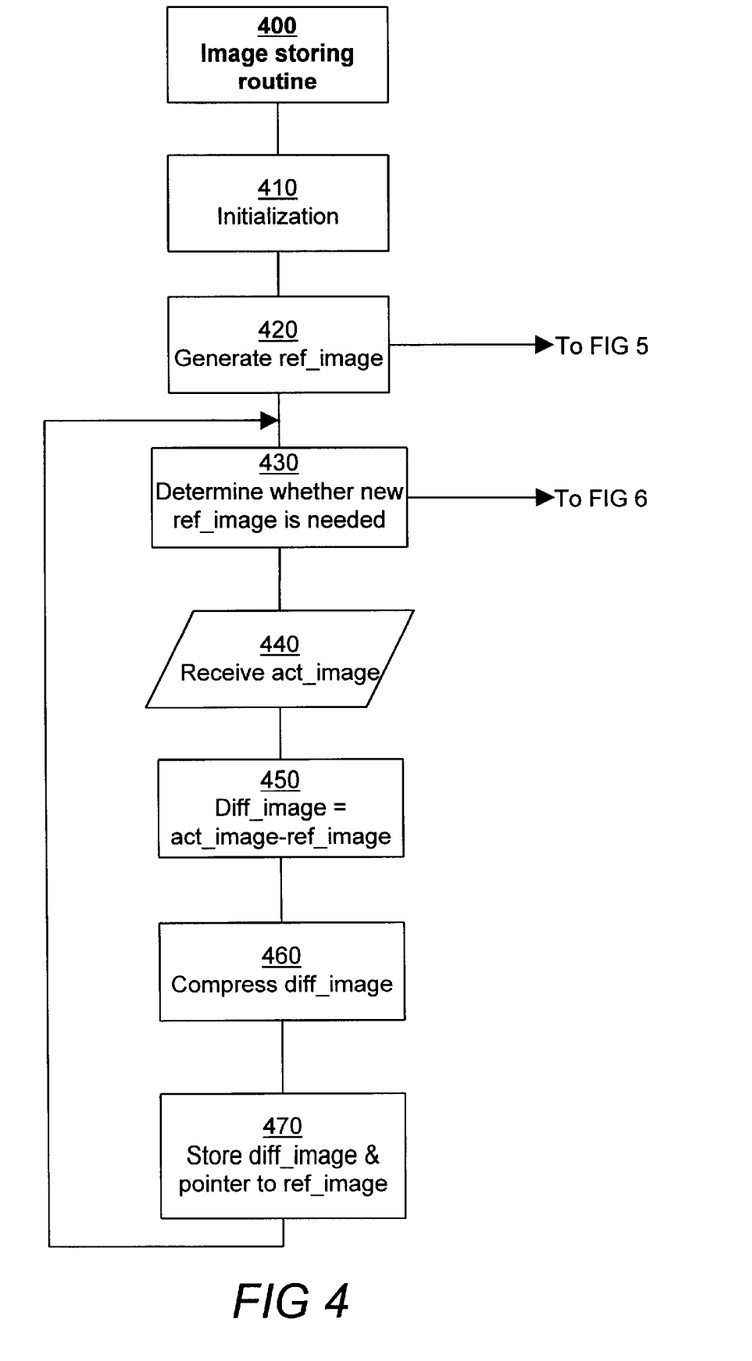
FIG. 4 is a flowchart diagram of an image storing routine according to the invention.

FIG. 4 illustrates an image storing routine 400, which is executed by the CPU 132 of the computer 130 shown in FIG. 1. In a first step 410, various registers, memories and variables are initialized. Then, in a step 420 a first reference image is generated. The generation of a reference image will be described in more detail with reference to FIG. 5.

In a step 430 it is determined whether the current reference image is still a satisfactory representation of the static background of the surveillance zone 110. The details of step 430 will be described in more detail below with reference to FIG. 6.

In a subsequent step 440, an actual image 300 is received. Then, a differential image 320 is calculated as the pixelwise difference between the actual image 300 and the reference image 310, as has already been described above.

The differential image 320 produced in step 450 is compressed in a step 460. Then, in a step 470, the compressed differential image 320 is stored in the hard disk 134. Moreover, together with the differential image 320 a pointer, reference or other type of identifying information is stored, which identify the current reference image 310, which was used in step 450 for producing the differential image 320. The reason for doing in this way is that when the stored differential images 320 are to be read by the computer 130 at a later moment, the CPU 132 will need to know which reference image 310, that was used in step 450 for producing the differential image 320, in order to restore the actual image 300.

Following termination of step 470, the control is transferred back to the beginning of step 430, wherein it is again determined whether a new reference image will have to be generated. In this way, a loop is formed, which will be iterated, as long as new actual images 300 are produced by the camera 120, or until the execution is terminated for other reasons by the CPU 132.

FIG. 5 illustrates a routine 500 for generating a reference image 310. In a first step 510, necessary initialization is performed. Then, in a loop 520, a predetermined number of actual images 300 are received from the camera 220. In FIG. 5, the loop 520 is iterated 10 times; however, more or less than 10 actual images may be read. When all actual images have been read in the loop 520, the reference image 310 is produced by calculating, pixel by pixel, a mean value of the respective pixel values of all actual images, that have been read in the loop 520. The reference image 310 thus generated in step 530 will be stored in the hard disk 134, as described above, and will also be copied to the RAM memory 136, to be used as current reference image by the CPU 132.

FIG. 6 illustrates a routine 600 for determining whether a new reference image is to be generated. In a first step 610, necessary initialization is performed. In a following step 620, a value of the current time is read by the CPU 132. Then, in a step 630 it is determined whether the difference between the current time and the time at which the last reference image was produced is larger than a predetermined limit, i.e. whether a certain time has lapsed, since the last reference image 310 was produced. The predermined limit may for instance be a certain number of minutes or hours.

If the answer to the question put in step 630 is in the affirmative, the routine for generating a new reference image shown in FIG. 5 will be called by the CPU 132, as illustrated by a step 640 in FIG. 6. Otherwise, the execution is terminated in a step 650.

Alternatively, the determination as to whether a new reference image is to be produced may be performed by continuously monitoring a resulting file size of the individual differential images 320. When the file size of a differential image 320 exceeds a predetermined limit, i.e. a predetermined number of bytes, it is determined that a new reference image 310 must be produced.

Figure 7:
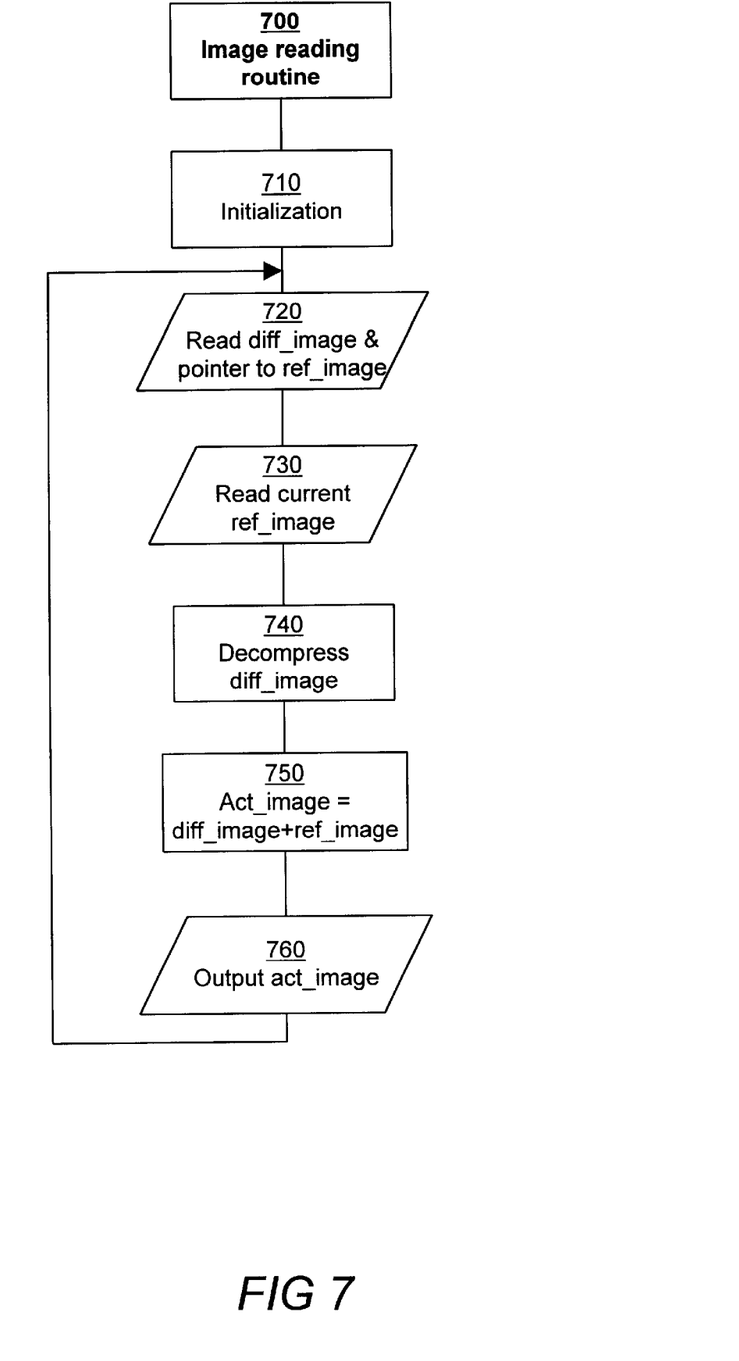
FIG. 7 is a flowchart diagram of an image reading routine according to the invention.

FIG. 7 illustrates an image reading routine 700 performed by the CPU 132 for reading differential images 320 stored in the hard disk 134. In a first step 710, necessary initialization is performed. Then, in a step 720 an individual differential image 320 is read from the hard disk 134 into the RAM memory 136, together with the pointer or identifying reference to the particular reference image, which was used as current reference image 310, when the individual differential image 320 was produced. In a step 730, it is first determined whether the reference image identified in step 720 is identical to the current reference image kept in the RAM memory 136. If this is the case, then the execution continues to a step 740. Otherwise, the reference image in question is read from the hard disk 134 into the RAM memory 136.

In a subsequent step 740, the compressed differential image 320 is decompressed. In a step 750, an actual image 300 is produced by adding, pixel by pixel, the differential image 320 to the reference image 310. The actual image 300 thus produced is then output in a last step 760. The actual image 300 may for instance be presented on a monitor connected to the computer 130 through the monitor interface 142. Alternatively, the actual image 300 may be transmitted across the network 150 via the network interface 140. Following termination of step 760, the execution is transferred back to the beginning of step 720, wherein a loop is formed. This loop continues as long as there are still differential images 320 to be read from the hard disk 134, or until the execution is terminated by the CPU 132 for other reasons.

Figure 2:
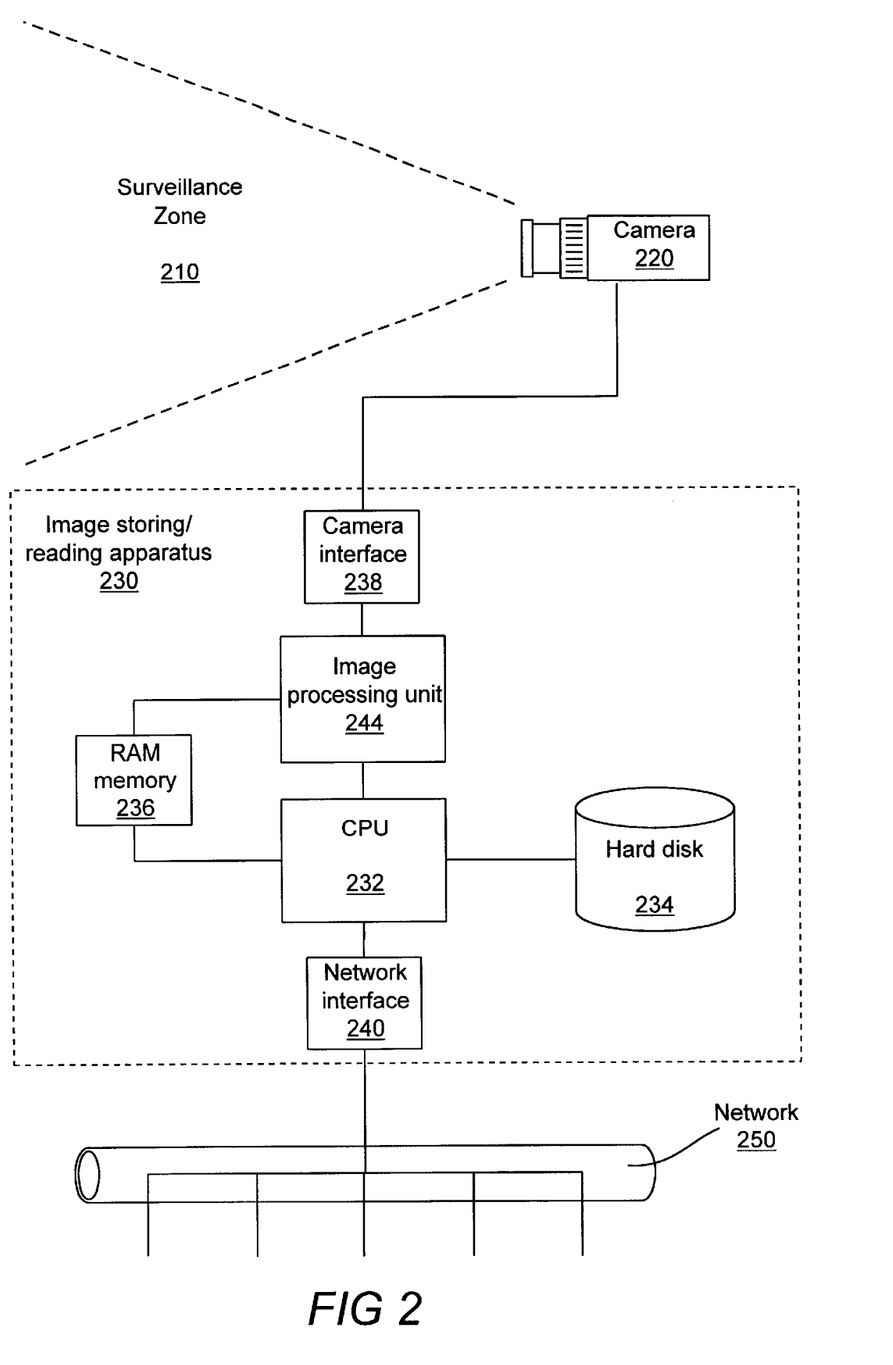
FIG. 2 is a schematic block diagram of an alternative embodiment of an apparatus according to the invention, when used in a camera surveillance application, FIGS. 3A–3C give an illustration of the different types of images involved in the present invention.

The preferred embodiment of the invention has been described above with reference to FIG. 1 and FIGS. 4–7, where the invention is implemented as a combination of software and hardware in a computer 130. According to an alternative embodiment, which is illustrated in FIG. 2, the invention is implemented as a dedicated device, which is referred to as an "image storing/reading apparatus 230" in FIG. 2. Elements in FIG. 2, which have the same last two digits as a corresponding element in FIG. 1, are essentially identical to the latter and are therefore not described in more detail now. The apparatus 230 comprises a camera interface 238 for connecting a camera 220 to the apparatus 230. An image processing unit 244 is coupled at an input thereof to the camera interface 238 and also to a RAM memory 236 as well as to a central processing unit 232. The central processing unit (CPU) 232 is coupled to a hard disk 234 and to a network interface 240, by means of which the apparatus 230 may be connected to a network 250.

In similarity with FIG. 1, the RAM memory 236 will contain the current reference image 310. The image processing unit 244 is adapted to receive an actual image 300 from the camera 220, calculate a differential image 320 as the pixelwise difference between the actual image 300 and the reference image 310, compress the differential image 320, and forward the differential image to the CPU 232, which will store the differential image 320 in the hard disk 234 together with a pointer or other identifying reference to the current reference image 310. The procedures described above with reference to FIGS. 5 and 6 for generating a new reference image and for determining whether such a new reference image must be produced, are carried out by the image processing unit 244 and the CPU 232 in essentially the same way, as has been described above. Moreover, the differential images 320 stored in the hard disk 234 are read and restored to actual images 300 in essentially the same way, as has been described above.

As an alternative to the above, the digital camera 220 may be integrated into the apparatus 230, thereby eliminating the need for a separate camera interface 238. The image processing unit 244 may be implemented by any commercially available programmable logic device, such a microprocessor, a digital signal processor (DSP), or as an ASIC circuit. The hard disk 234 may be integrated with the apparatus 230, as is illustrated in FIG. 2, or may alternatively be located externally to the apparatus 230. In the latter case, the hard disk 234 may be connected to the apparatus 230 by a direct cable connection or, alternatively, the hard disk 234 may be operatively coupled to the apparatus 230 through the network 250 and the network interface 240.

The present invention has been described above with reference to a preferred and an alternative embodiment. However, other embodiments than the ones described above are equally possible within the scope of the invention, as defined by the appended independent patent claims. In particular, the hard disk 134, 234 may equally well be implemented by any other type of permanent storage medium, such as a magnetic, optical or magnetooptical storage device, or by an electronic memory, such as a large RAM memory. Correspondingly, the RAM memory 136, 236 may alternatively be implemented by any other electronic memory, such as an EEPROM memory, a flash memory, etc.

What is claimed is:

1. An apparatus for storing an input of sequential images, comprising
   a storage device for storing images;
   an image processing device coupled to the storage device, and the image processing device configured to generate from the input of sequential images both a reference image corresponding to a static background portion of the sequential images together with a succession of differential images each corresponding to non-static portions of successive ones of the sequential images with respect to the reference image; and to store the reference image and the succession of differential images on the storage device, wherein the reference image corresponds to a mean value of the respective pixel values of successive ones of the sequential images and each differential image corresponds to a difference between respective pixel values of a one of the successive images and the reference image.

2. The apparatus of claim 1, wherein the image processing device stores a reference to the current reference image together with each differential image on the storage device.

3. The apparatus of claim 1, wherein the storage device comprises at least one of: a magnetic storage device, an optical storage device, a hard disk an electronic memory and a random access memory (RAM).

4. The apparatus of claim 3, wherein the image processing device compresses the differential image before supplying it to the storage device.

5. The apparatus of claim 1, further comprising:
   the image processing device further configured to determine whether a current reference image substantially corresponds to the static background portion of current sequential images and to replace the current reference image with a new reference image as a result of a negative determination.

6. The apparatus of claim 1, further comprising:
   the image processing device further configured to determine whether to replace a current reference image with a new reference image based on criteria including at least one of: a size of the differential images and a time interval since the current reference image was produced.

7. The apparatus of claim 1, wherein the image processing device comprises a programmable logic processor.

8. An image reading apparatus, comprising:
   a storage device for storing both reference images each corresponding to a static background portion of successive sequential images together with differential images each corresponding to non-static portions of successive ones of the sequential images with respect to an associated one of the reference images; wherein each reference image corresponds to a mean value of the respective pixel values of successive ones of the sequential images and each differential image corresponds to a difference between respective pixel values of a one of the successive images and the reference image, and
   an image processing device coupled to the storage device, and the image processing device configured to additively combine each successive differential image with an associated one of the reference images to generate a succession of non-differential images which form an output of the image reading apparatus.

9. The image reading apparatus of claim 8, wherein the additive combination performed by the image processing device corresponds with an addition of the respective pixel values of each differential image and an associated one of the reference images.

10. An image reading apparatus as in claim 9, wherein the storage device comprises at least one of: a magnetic of optical storage device, a hard disk an electronic memory and a random access memory (RAM).

11. A method of storing an input of sequential images,
   generating from the input of sequential images both a reference image corresponding to a static background portion of the sequential images together with a succession of differential images each corresponding to non-static portions of successive ones of the sequential images with respect to the reference image; wherein reference image generation includes:

receiving a plurality of sequential images, calculating mean pixel values for pixels at corresponding positions in the plurality-sequential images, and forming the reference image by assigning the calculated mean pixel values in the plurality of sequential images to the corresponding pixels of the reference image; and repeating the generating act based on a predetermined criteria.

12. The method of claim 11, wherein the predetermined criteria associated with the repeating act comprises:

determining that a predetermined time period has lapsed, since the current reference image was produced.

13. The method of claim 11, wherein the predetermined criteria associated with the repeating act comprises:

determining that a differential image is larger than a predetermined number of bytes.

14. A method of of storing an input of sequential images, comprising:

generating from the input of sequential images both a reference image corresponding to a static background portion of the sequential images together with a succession of differential images each corresponding to non-static portions of successive ones of the sequential images with respect to the reference image: wherein differential image generation includes:

receiving a plurality of sequential images;

calculating a difference between respective pixel values of a one of the successive images and the reference image; and forming each differential image from the difference calculated in the calculating act.

* * * * *